United States Patent [19]
Durand et al.

[11] Patent Number: 5,789,635
[45] Date of Patent: Aug. 4, 1998

[54] METHOD FOR INHIBITING OR RETARDING HYDRATE FORMATION, GROWTH AND/OR AGGLOMERATION

[75] Inventors: Jean-Pierre Durand, Chatou; Anne Sinquin, Rueil Malmaison; Marie Velly, Paris, all of France

[73] Assignee: Institut Francais du Petrole, France

[21] Appl. No.: 796,133

[22] Filed: Feb. 6, 1997

[30] Foreign Application Priority Data

Feb. 7, 1996 [FR] France ................................. 96 01584
Apr. 4, 1996 [KR] Rep. of Korea ....................... 96 04392

[51] Int. Cl.$^6$ ................................. C07C 7/20; C10G 9/16
[52] U.S. Cl. ................................. 585/15; 585/5; 585/950; 137/3; 137/15; 166/310; 166/371; 95/153; 208/48 AA
[58] Field of Search ................................. 585/5, 15, 950; 137/3, 15; 166/310, 371; 95/153; 208/48 AA

[56] References Cited

U.S. PATENT DOCUMENTS 5,639,925  6/1997  Sloan, Jr. et al. ................ 585/15

FOREIGN PATENT DOCUMENTS

95/32356  11/1995  WIPO.

*Primary Examiner*—Elizabeth D. Wood
*Attorney, Agent, or Firm*—Millen, White, Zelano & Branigan, P.C.

[57] ABSTRACT

The invention concerns a process for inhibiting or retarding hydrate formation, growth and/or agglomeration in a fluid comprising water and gases, by addition of a hydrosoluble copolymer which does not contain a heterocycle but contains at least one sulphonate group.

The copolymer is generally introduced at a concentration of 0.05% to 5% by weight with respect to the quantity of water in the medium.

The copolymer can also be mixed with an alcohol (monoalcohol or polyol). In this case, the proportions are generally 0.5% to 20% by weight of alcohol with respect to the water content, for 0.05% to 3% by weight of copolymer with respect to the quantity of water content of the medium.

14 Claims, No Drawings

METHOD FOR INHIBITING OR RETARDING HYDRATE FORMATION, GROWTH AND/OR AGGLOMERATION

BACKGROUND OF THE INVENTION

The invention concerns a process for inhibiting or retarding hydrate formation, growth and/or agglomeration in natural gas, petroleum gas or other gases, using at least one additive. Gases which form hydrates can comprise at least one hydrocarbon selected from methane, ethane, ethylene, propane, propene, n-butane and isobutane, and possibly $H_2S$ and/or $CO_2$.

Such hydrates are formed when water comes into the presence of a gas either in its free state or dissolved in a liquid phase such as a liquid hydrocarbon, and when the temperature of the mixture, including water, gas and possibly liquid hydrocarbons such as oil, drops below the thermodynamic temperature for hydrate formation, this temperature being fixed for a known gas composition and when the pressure is fixed.

Hydrate formation is a problem, particularly in the gas and oil industry where hydrate formation conditions can be satisfied. One way of reducing the production costs of crude oil and gas both from the point of view of investment and exploitation, particularly in the case of offshore production, is to reduce or cut out treatments applied to the crude or gas to be transported from the field to the coast and leave all or part of the water in the fluid to be transported. Such offshore treatments are generally carried out on a platform located on the surface close to the field, so that the effluent, which is initially hot, can be treated before the thermodynamic hydrate formation conditions are reached due to cooling of the effluent with sea water.

However, in practice, when the thermodynamic conditions required for hydrate formation are satisfied, hydrate agglomeration causes the transport lines to block by creation of plugs which prevent the passage of crude or gas.

The formation of hydrate plugs can stop production and result in large financial losses. Further, restarting the installation, especially in the case of offshore production or sea transportation, can be a long process as the hydrates formed are very difficult to decompose. When the production from a submarine natural gas or oil and gas field containing water reaches the surface of the sea bed and is transported along the sea bottom, the reduction in the temperature of the effluent produced can mean that the thermodynamic hydrate formation conditions are satisfied and the hydrates formed agglomerate and block the transfer lines. The temperature on the sea bed can, for example, be 3° C. or 4° C.

Favourable conditions for hydrate formation can also be satisfied onshore when, for example, the ambient air temperature is low and the lines are not buried, or are not deeply buried in the ground.

In order to overcome these disadvantages, the prior art has sought to use substances which, when added to the fluid, can act as inhibitors by reducing the thermodynamic hydrate formation temperature. Such substances include alcohols such as methanol, or glycols such as mono-, di- or triethyleneglycol. Such a solution is very expensive as the quantity of inhibitors to be added can be as high as 10% to 40% of the water content and those inhibitors are difficult to recover completely.

Insulation of the transport lines has also been recommended, to prevent the temperature of the transported fluid from reaching the hydrate formation temperature under the operating conditions. This type of technique is also very expensive.

The use of additives which can modify the hydrate formation mechanism has also been recommended, in which instead of agglomerating rapidly with each other and forming plugs, the hydrates formed disperse in the fluid without agglomerating and without obstructing the lines. Examples are: our European patent application EP-A-0 323 774, which describes the use of non-ionic amphiphilic compounds selected from the esters of polyols and carboxylic acids, which may or may not be substituted, and compounds with an imide function; our European patent application EP-A-0 323 775, which describes the use of compounds from diethanolamides of fatty acids or fatty acid derivatives; U.S. Pat. No. 4,956,593 which describes the use of surfactants such as organic phosphates, phosphate esters, phosphonic acids, and salts and esters thereof, inorganic polyphosphates and esters thereof, and polyacrylamides and polyacrylates; and European patent application EP-A-0 457 375, which describes the use of anionic surfactants such as alkylarylsulphonic acids and their alkali metal salts.

Amphiphilic compounds obtained by reacting at least one succinic derivative selected from the group formed by polalkenylsuccinic acids and anhydrides with at least one polyethyleneglycol monoether have also been proposed for reducing the tendency of natural gas hydrates, petroleum gas hydrates or other gas hydrates to agglomerate (European patent application EP-A-0 582 507).

The use of additives which can inhibit or retard hydrate formation and/or growth has also been recommended. Examples are European patent application EP-A-0 536 950 which describes the use of tyrosine derivatives, International patent application WO-A-93 25798 which describes the use of homopolymers and copolymers of N-vinyl-2-pyrrolidone and mixtures thereof, International patent application WO-A-94 12761 and U.S. Pat. No. 5,432,292 which describe the use of poly(N-vinyl-2-pyrrolidone), hydroxyethyl-cellulose and mixtures thereof or a terpolymer based on N-vinyl-2-pyrrolidone, ε-vinyl-caprolactame and dimethylaminoethyl methacrylate sold under the trade name GAFFIX VC-713. International patent application WO-A-95 19408 more generally describes the use of aliphatic polymers containing carbonylated N-heterocycles in complex formulations. This is also the case in International patent application WP-A-95 32356, which describes the use of terpolymers based on N-vinyl-2-pyrrolidone, acrylamidomethylpropanesulphonate and acrylamide. Finally, International patent application WO-A-95 17579 describes the use of alkylated ammonium, sulphonium and phosphonium derivatives.

SUMMARY OF THE INVENTION

We have now discovered that, in contrast to the teaching of International patent application WO-A-95 32356, certain hydrosoluble copolymers which do not contain heterocycles and which are negatively charged can inhibit or retard hydrate formation, growth and/or agglomeration in natural gas, petroleum gas or other gases, at low concentrations, with an efficiency which is substantially superior to the compounds previously described.

Thus the invention provides a process for inhibiting or retarding hydrate formation, growth and/or agglomeration in a fluid comprising water and a gas, under conditions in which hydrates can form (from the water and gas), characterized in that at least one hydrosoluble copolymer is incorporated into the fluid, the hydrosoluble copolymer having general formula:

$$[A]_n[B]_m[C]_p \quad [1]$$

where moieties of type [A] contain at least one sulphonate group, moieties of type B are derived from hydrophilic monomers and moieties of type [C] are derived from hydrophobic monomers.

[A] moieties have general formula

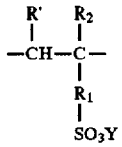

$$\begin{array}{c} R' \quad R_2 \\ | \quad | \\ -CH-C- \\ | \\ R_1 \\ | \\ SO_3Y \end{array} \quad [2]$$

where $R_1$ is selected from a single bond, divalent $CH_2$ groups and divalent $C_6H_4$ groups, $CONHC(CH_3)_2-CH_2$ and $CO-NHR''$, where $R''$ is a $C_2$ to $C_{10}$ alkylene group, $R_2$ is a hydrogen atom or a methyl radical, $R'$ is a hydrogen atom or a methyl radical and Y is a hydrogen atom, an alkali metal atom or an ammonium group;

[B] moieties have general formula:

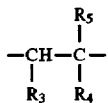

$$\begin{array}{c} R_5 \\ | \\ -CH-C- \\ | \quad | \\ R_3 \quad R_4 \end{array} \quad [3]$$

where $R_3$ is a hydrogen atom or a COOY group where Y is a hydrogen atom, an alkali metal atom or an ammonium group, $R_4$ is selected from groups COOY where Y is a hydrogen atom, an alkali metal atom or an ammonium group, groups $CONH_2$ and $NR'-COR'$ where $R'$ represents a hydrogen atom or a methyl group, and $R_5$ is a hydrogen atom or a methyl group; and

[C] moieties have general formula:

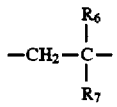

$$\begin{array}{c} R_6 \\ | \\ -CH_2-C- \\ | \\ R_7 \end{array} \quad [4]$$

where $R_6$ is a hydrogen atom or a methyl group and $R_7$ is selected from groups $C_6H_5$, $COOR'_1$, $CONHR'_1$ or $CONR'_1R'_2$ and $NR'_1COR'_2$ where $R'_1$ and $R'_2$ represent a $C_1-C_{30}$ alkyl radical, preferably a $C_3-C_{14}$ alkyl radical, or a $C_6-C_{30}$ aryl or alkylaryl radical.

The copolymer used as an additive in the process of the invention can comprise at least one type [A] moiety, at least one type [B] moiety and optionally at least one type [C] moiety. The proportions of the different monomers defined in the invention vary from 5 to 100 mole % for the type [A] moiety or moieties, 0 to 95 mole % for the type [B] moiety or moieties and 0 to 20 mole % for the type [C] moiety or moieties. Thus in formula [1], for the sum n+m+p of 1, the value of n can be 0.05 to 1, that of m is 0 to 0.95 and that of p is 0 to 0.2.

The copolymers described above can have a mass average molar mass of 2000 to 10000000.

Examples of preferred copolymers for use in the process of the invention are those in which the [A] moieties derive from at least one compound selected from acrylamidomethylpropane sulphonate, methacrylamidomethylpropane sulphonate, vinyl sulphonate and styrene sulphonate; the [B] moieties derive from at least one compound selected from acrylic acid, methacrylic acid, acrylamide and methacrylamide and the [C] moieties derive from at least one compound selected from $C_3$ to $C_{14}$ alkyl methacrylates such as nonyl methacrylate.

In the process of the invention, the copolymers such as those described above can be added to the fluid to be treated either alone or in the form of mixtures of two or more copolymers, for example two copolymers. The two mixed copolymers can, for example, differ in the nature of the moieties of at least one type and/or by a different composition of at least one moiety and/or by their molar mass. Mixtures of any proportions of at least two copolymers can be added to the fluid to be treated at concentrations which are in general 0.05% to 5% by weight, preferably 0.1% to 2% by weight, with respect to the water.

Further, the copolymers recommended for use as additives can be mixed with one or more alcohols (monoalcohols or polyols) which contain, for example, 1 to 6 carbon atoms, more particularly mono-, di- or tri-ethylene glycol, ethanol or methanol, the latter being the preferred alcohol. This alcohol (or these alcohols) is (are) generally added in proportions of 0.5% to 20% by weight, preferably 1% to 10% by weight, with respect to the water present in the fluid to be treated. The copolymers considered in respect of the invention can thus first be dissolved in a hydro-alcoholic medium and then added to the medium to be treated so as to obtain final copolymer concentrations of generally 0.05% to 3% by weight, preferably 0.1% to 1% by weight, with respect to the water present in the fluid to be treated. The conjugated action of the presence of kinetic additive(s) such as the polymers of the invention and alcohol(s) such as methanol in the medium can retard hydrate formation extremely satisfactorily, at the same time reducing the quantities of additives used (alcohols and polymers) and, in particular, allowing in a much lower temperature range to be used.

The hydrosoluble copolymers considered in the process of the invention can be used whether in a pure water medium, for example in water of condensation, or in a saline medium, for example in production water.

The invention will be better understood from the following non limiting experiments, carried out in the presence of THF hydrates. Example 4 to 12 are given by way of comparison and do not form part of the invention.

EXAMPLE 1

The experimental additive selection procedure was carried out on hydrates of tetrahydrofuran (THF). A pure water/THF solution (80/20 by weight) forms hydrates at atmospheric pressure at 4° C. (*Kinetic Inhibitors of Natural Gas Hydrates*, E. D. Sloan et al., 1994).

The apparatus used was constituted by tubes with a 16 mm diameter into which 8 ml of an aqueous solution containing 20% by weight of THF, possibly containing the additive to be tested, was introduced. An 8 mm diameter glass ball was introduced into each tube to ensure proper agitation of the solution. The tubes were placed on a rotating stirrer which rotated at 20 turns/min. The stirrer was placed in a refrigerated chamber at 2° C.

The aim of this test was to determine the latency time preceding hydrate formation. The latency time corresponds to the interval measured between the time when the tubes are introduced into the refrigerated chamber and the time when hydrate formation is observed (appearance of cloudiness).

Each series of tests was carried out in the presence of a reference mixture containing no additive and the latency times provided for any one additive corresponded to an average of the time for the 16 tests.

Under the operating conditions described above, the pure water/THF solutions had an average latency time of 35 minutes.

Under the operating conditions used, addition of 0.5% by weight of an acrylamide/acrylamidomethylpropane sulphonate (AA/AMPS) copolymer containing 10 mole % of AMPS moieties and with mass $2 \times 10^6$ multiplied the latency time by approximately 5, and addition of 0.5% by weight of an AA/AMPS copolymer with mass 500000 containing 25% of AMPS type monomers produced an induction time which was on average 7 times greater than that of pure water. Addition of 0.5% by weight of a copolymer containing 68% of acrylamide moieties, 12% of AMPS moieties and 20% of acrylic acid moieties multiplied the latency time by 7.5. The addition of 0.5% by weight of a copolymer containing 50 mole % of styrene sulphonate (SS) moieties and 50 mole % of acrylamide moieties (AA) multiplied the latency time by 8. Finally, addition of a mixture of AA/SS (50/50)+AA/AMPS (75/25) in a ratio of 40/60 by weight at a concentration of 0.3% by weight with respect to the water inhibited formation of THF hydrates for a period of more than 6 hours.

EXAMPLE 2

The experimental procedure of Example 1 was repeated, replacing the pure water with a pure water+5% by weight methanol mixture and reducing the temperature of the refrigerated chamber to −1° C.

Under these conditions, the average latency time of pure water +5% methanol/THF solutions in the absence of water was 29 minutes.

Addition of 0.15% by weight of an AA/AMPS copolymer (60/40) to the water+5% methanol solution multiplied the latency time by more than 8.

EXAMPLE 3

The experimental procedure of Example 1 was repeated, replacing the pure water with a solution of 3.5% by weight NaCl, and the temperature of the refrigerated chamber was reduced to 0° C. Under these conditions, the average latency time of the NaCl/THF solutions in the absence of additive was 42 minutes.

Addition of 0.3% by weight of a terpolymer containing 25 mole % of AMPS moiety, 73.5 mole % of acrylamide moiety and 1.5 mole % of hydrophobic nonyl methacrylate moieties (MANON) multiplied the latency time by about 6. Addition of 0.3% by weight of an AA/MANON/AMPS/acrylic acid copolymer (85.25/0.75/13/1) multiplied the latency time by more than 7.

Addition of 0.5% by weight of an AA/AMPS copolymer with mass $8 \times 10^6$ containing 12 mole % of AMPS type moieties or an AA/AMPS/N-vinylacetamide terpolymer (31/55/14) with mass $2 \times 10^6$, or addition of 0.3% by weight of an AA/AMPS copolymer with mass $10^6$ containing 40% by weight of AMPS type moieties inhibited the formation of THF hydrates for a period of more than 6 hours.

EXAMPLES 4 TO 12 (comparative)

Different additives which were outside the scope of the invention were tested for comparison under the conditions described above (examples 1, 2 and 3):

EX. 4: Polyvinyl pyrrolidone (molecular weight 10000; 0.5% by weight);

EX. 5: Polyacrylamide (0.5% by weight).

EX. 6:

Acrylamide/sodium acrylate copolymer (0.5% by weight).

EX. 7: Alkylaryl sulphonate type commercial surfactant: DOBANAX 312 (0.5% by weight).

EX. 8: Alkylsulphonate type commercial surfactant: BIOTERGE PAS 8 S (1.5% by weight of commercial solution, i.e., 0.5% by weight of active material).

EX. 9: GAFFIX VC-713 (N-vinyl-2-pyrrolidone/ε-vinyl-caprolactame/dimethylaminoethyl methacrylate; 0.3% by weight).

EX. 10: HE-300 (N-vinyl-2-pyrrolidone/acrylamidomethylpropane sulphonate/acrylamide terpolymer: 0.3% by weight).

EX. 11: Alkylaryl sulphonate type commercial surfactant: DOBANAX-312 (0.3% by weight).

EX. 12: Alkyl sulphonate type commercial surfactant: BIOTERGE PAS 8 S (0.9% by weight of commercial solution, i.e., 0.3% by weight of active matter).

Under these test conditions, the additives had induction times preceding hydrate formation which were substantially shorter than the substances within the context of the invention, as shown in the summary of results in the following table.

| Additive (mole % of moieties) | Concentration (% by weight) | Operating conditions | Latency time (min) |
|---|---|---|---|
| Ex. 1: | | | |
| no additive | / | pure water/THF, 2° C. | 35 |
| AA/AMPS (90/10) | 0.5 | pure water/THF, 2° C. | 163 |
| AA/AMPS (75/25) | 0.5 | pure water/THF, 2° C. | 261 |
| AA/AMPS/Acrylic acid (68/12/20) | 0.5 | pure water/THF, 2° C. | 263 |
| AA/SS (50/50) | 0.5 | pure water/THF, 2° C. | 283 |
| AA/SS (50/50) + AA/AMPS (75/25) [40/60] | 0.3 | pure water/THF, | >360 |
| Ex. 2: | | | |
| no additive | / | water + 5% MeOH/THF, −1° C. | 29 |
| AA/AMPS (60/40) | 0.15 | water + 5% MeOH/THF, −1° C. | 240 |
| Ex. 3 | | | |
| no additive | / | 3.5% NaCl/THF, 0° C. | 42 |
| AA/AMPS/MANON (73.25/25/1.5) | 0.3 | 3.5% NaCl/THF, 0° C. | 248 |
| AA/MANON/AMPS/Acrylic acid (85.25/0.75/13/1) | 0.3 | 3.5% NaCl/THF, 0° C. | 305 |
| AA/AMPS (88/12) | 0.5 | 3.5% NaCl/THF, 0° C. | >360 |
| AA/AMPS/VA (31/55/14) | 0.5 | 3.5% NaCl/THF, 0° C. | >360 |
| AA/AMPS (60/40) | 0.3 | 3.5% NaCl/THF, 0° C. | >360 |
| Ex. 4: | 0.5 | pure water/THF, 2° C. | 45 |
| Ex. 5: | 0.5 | pure water/THF, 2° C. | 100 |
| Ex. 6: | 0.5 | pure water/THF, 2° C. | 71 |
| Ex. 7: | 0.5 | pure water/THF, 2° C. | 54 |

7
-continued

| Additive (mole % of moieties) | Concentration (% by weight) | Operating conditions | Latency time (min) |
|---|---|---|---|
| Ex. 8: | 1.5 (0.5 a.m.) | pure water/THF, 2° C. | 79 |
| Ex. 9: | 0.3 | 3.5% NaCl/THF, 0° C. | 204 |
| Ex. 10: | 0.3 | 3.5% NaCl/THF, 0° C. | 220 |
| Ex. 11: | 0.3 | 3.5% NaCl/THF, 0° C. | insoluble |
| Ex. 12: | 0.9 (0.3 a.m.) | 3.5% NaCl/THF, 0° C. | insoluble |

EXAMPLE 13

In order to test the effectiveness of the substances used in the process of the invention in the presence of hydrates of methane, hydrate formation tests using gas and water were carried out using the apparatus described below.

The apparatus comprised a 6 meter circuit constituted by tubes with an internal diameter of 7.7 mm, a 2 liter reactor comprising a gas inlet and outlet, an intake and a discharge for the mixture of water and additive initially introduced. The reactor kept the circuit under pressure. Tubes with an analogous diameter to those in the circuit ensured circulation of the fluid from the circuit to the reactor and vice versa via a gear pump placed between them. A sapphire cell integrated into the circuit allowed the circulating liquid, and thus any hydrates which were formed, to be observed.

In order to determine the effectiveness of the additives of the invention, the fluid (water and additive) was introduced into the reactor. The unit was then pressurised to a pressure of 7 MPa. The solution was homogenised by circulation in the circuit and the reactor then the circuit was isolated from the reactor. The pressure was held constant by adding methane and the temperature was gradually reduced (0.5° C./min) from 17° C. to 5° C., corresponding to the selected experimental temperature.

The principle of these tests was to determine the temperature at which methane hydrates were formed in the circuit and the latency time preceding their formation. The latency time corresponded to the time measured between the start of the test (fluid circulating at 17° C.) and detection of hydrate formation (exothermic, high gas consumption). The test duration varied between several minutes and several hours: a high performing additive inhibited hydrate formation or kept them dispersed in the fluids for several hours.

In the absence of additive (medium: deionised water), methane hydrates formed at a temperature of about 10.0° C. and after an induction time of 30 minutes. Hydrate formation led to immediate blockage of the circulation of the fluid +hydrates mixture in the circuit.

Addition of 0.3% by weight of AA/AMPS copolymer (60/40) with mass $10^6$ completely inhibited formation of methane hydrates under the pressure and temperature conditions of the test after 24 hours of circulation.

We claim:

1. A process for inhibiting or retarding hydrate formation, growth and/or agglomeration in a fluid comprising water and a gas, under conditions in which hydrates ordinarily form from the water and gas, said process comprising adding to the fluid at least one water-soluble copolymer in a sufficient amount to inhibit or retard hydrate formation, said water-soluble copolymer having the general formula:

$$[A]_n[B]_m[C]_p \qquad [1]$$

wherein n has a value of 0.05 to less than 1, m has a value of above 0 to 0.95 and p has a value of 0 to 0.2 for a sum n+m+p of 1, and wherein the [A] moieties have the general formula:

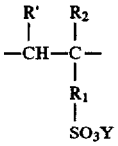

$$[2]$$

where $R_1$ is selected from the group consisting of a single bond, divalent $CH_2$ groups and divalent $C_6H_4$ groups, $CONHC(CH_3)_2$—$CH_2$ and CO—NHR" wherein R" is a $C_2$ to $C_{10}$ alkylene group, $R_2$ is a hydrogen atom or a methyl radical, R' is a hydrogen atom or a methyl radical and Y is a hydrogen atom, an alkali metal atom or an ammonium group; [B] moieties have the general formula:

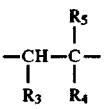

$$[3]$$

wherein $R_3$ is a hydrogen atom or COOY group wherein Y is a hydrogen atom, an alkali metal atom or an ammonium group, $R_4$ is selected from the group consisting of COOY wherein Y is a hydrogen atom, an alkali metal atom or an ammonium group, $CONH_2$, and NR'—COR' wherein R' represents a hydrogen atom or a methyl group; and $R_5$ is a hydrogen atom or a methyl group; and [C] moieties have the general formula:

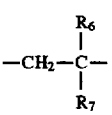

$$[4]$$

wherein $R_6$ is a hydrogen atom or a methyl group and $R_7$ is selected from the group consisting of $C_6H_5$, $COOR'_1$, $CONHR'_1$, $CONR'_1R'$ and $NR'_1COR'_2$ wherein $R'_1$ and $R'_2$ represent a $C_1$–$C_{30}$ alkyl radical or a C6–$C_{30}$ alkyl radical or a $C_6$–$C_{30}$ aryl or alkylaryl radical.

2. A process according to claim 1, wherein said water-soluble copolymer has a mass average molecular mass of 2000 to 10000000.

3. A process according to claim 1, wherein said water-soluble copolymer is added to the fluid in a concentration of 0.05% to 5% by weight with respect to the water content.

4. A process according to claim 1, wherein said concentration is 0.1% to 2% by weight with respect to the water content.

5. A process according to claim 1, wherein said water-soluble copolymer is used in a mixture with at least one alcohol selected from monoalcohols and polyols containing 1 to 6 carbon atoms.

6. A process according to claim 5, characterized in that said alcohol is used in a proportion of 0.5% to 20% by weight with respect to the water.

7. A process according to claim 5, characterized in that said water-soluble copolymer is first dissolved in an aqueous alcoholic medium in an appropriate proportion and the solution is added to the fluid in a proportion corresponding to a concentration of copolymer of 0.05% to 3% by weight with respect to the water.

8. A process according to any one of claim 1 to 7, characterized in that said water-soluble copolymer is used in pure water.

9. A process according to claim 1 said water-soluble copolymer is used in a saline medium.

10. A process according to claim 1, wherein in said copolymer, the [A] moieties derive from at least one compound selected from the group consisting of acrylamidomethylpropane sulphonate, methacrylamidomethylpropane sulphonate, vinyl sulphonate and styrene sulphonate; the [B] moieties derive from at least one compound selected from the group consisting of acrylic acid, methacrylic acid, acrylamide and methacrylamide; and the [C] moieties derive from at least one $C_3$ to $C_{14}$ alkyl methacrylate.

11. A process according to claim 1, wherein moiety [C] is part of said copolymer.

12. A process according to claim 10, wherein moiety [C] is part of said copolymer.

13. A process according to claim 2, wherein moiety [C] is part of said copolymer.

14. A process according to claim 10, wherein the (c) moiety is derived from nonyl methacrylate.

* * * * *